United States Patent Office 3,355,495
Patented Nov. 28, 1967

3,355,495
2-SUBSTITUTED B-NORANDROSTENES AND ESTRENES
Kenneth C. Holden, Stratford, N.J., assignor to Smith Kline & French Laboratories, Philadelphia, Pa., a corporation of Pennsylvania
No Drawing. Filed Aug. 6, 1965, Ser. No. 477,949
6 Claims. (Cl. 260—586)

ABSTRACT OF THE DISCLOSURE

2α-alkyl or alkylandrost-4-enes and estr-4-enes, prepared by alkylation or allylation of a 2-ethoxalyl compound and hydrolysis of the ethoxalyl group. The products are antiandrogens.

---

This invention relates to 2α-substituted B-norsteroids having antiandrogenic activity. In particular, the invention relates to 2α-lower alkyl or allyl-B-norandrost-4-en-3-ones and estr-4-en-3-ones.

The chemical compounds of the invention are thus represented by the following structural formula:

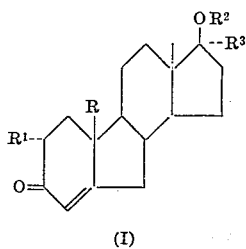

(I)

wherein:

R is hydrogen, hydroxymethyl, or methyl;
R$^1$ is lower alkyl of up to about four carbon atoms, allyl, or methylallyl;
R$^2$ is hydrogen or lower acyl;
R$^3$ is hydrogen, methyl, or ethyl; and when R$^3$ is hydrogen, R$^2$ can also be 1-cyclopentenyl, 1-cyclohexenyl, or 2-tetrahydropyranyl.

The pereferred group of compounds of the invention is represented by Formula I when R is methyl.

Another preferred group of compounds is represented by Formula I when R is hydrogen or methyl; R$^1$ is lower alkyl of up to about four carbon atoms; and R$^3$ is hydrogen, methyl, or ethyl.

The preferred compound of the invention is 2α,17α-dimethyl-B-nortestosterone (II).

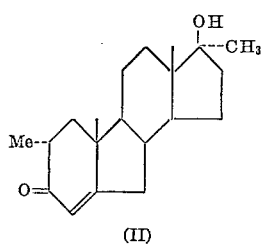

(II)

The compounds of the invention in which R$^2$ is hydrogen are prepared by stirring at room temperature the corresponding 2α-unsubstituted B-norsteroid with ethyl oxalate in the presence of a strongly basic catalyst such as sodium hydride in an inert solvent such as benzene, toluene, chloroform, or ether. The resulting enolic 2-ethoxalyl compound is then dissolved in a solvent such as acetone or ethanol and heated for a period of about 6 to 50 hours with an alkyl or allyl halide in the presence of a weak base such as potassium or sodium carbonate. The 2-alkyl(or allyl)-2-ethoxalyl compound so produced is then allowed to stand in alcoholic alkoxide solution. A reverse oxalate condensation occurs to give the 2α-alkyl (or allyl)-B-norsteroid.

The term "lower alkyl" as used to define the 2-substituent of the compounds of Formula I is intended to include those alkyl groups having up to about four carbon atoms therein. Among the alkyl and allyl halides which may therefore be employed for the preparation of the compounds of the invention, there may be mentioned methyl iodide, ethyl iodide, propyl iodide, butyl bromide, allyl bromide, and 2-methylallyl bromide.

The term "lower acyl" is intended to include those acyl groups having up to about six carbon atoms therein, particularly acetyl, propionyl, butyryl, and valeryl.

Among the 2-unsubstituted steroidal starting materials which may be used for the ethyl oxalate condensation and subsequent alkylation procedure are B-nortestosterone, 17α-methyl-B-nortestosterone, 17α-ethyl - B - nortestosterone, B-nor-19-nortestosterone, 17α - methyl - B - nor-19-nortestosterone, 17α-ethyl-B-nor-19 - nortestosterone, 19-hydroxy-B-nortestosterone, and 19 - hydroxy - 17α-methyl-B-nortestosterone. The preparation of these starting B-norsteroids is either disclosed hereinbelow, in U.S. Patent No. 3,072,681, or in Coll. Czech. Chem. Comm. 25, 1086–90 (1960).

The compounds of the present invention in which R$^2$ is lower acyl are prepared by treating the corresponding 17β-hydroxy compound with the appropriate acyl halide or anhydride in the presence of a base such as pyridine. Compounds in which R$^2$ is 1-cyclopentenyl, 1-cyclohexenyl, or 2-tetrahydropyranyl are prepared by treating the 17β-ol with cyclopentanone or cyclohexanone diethyl ketal or with dihydropyran in the presence of an acid catalyst such as p-toluenesulfonic acid.

The compounds of the invention, having antiandrogenic activity, are useful in those instances in which it is desired to decrease or eliminate the androgenic response or the effects of androgens. The preferred compound of the invention, 2α,17α-dimethyl - B - nortestosterone, has been found to exert a strong antiandrogenic effect when administered subcutaneously to rats at a dose of 100 mg./kg. A solution in about 2 cc. of sesame oil is an effective vehicle for administration. Other formulations which are obvious to those skilled in the art of pharmaceutical chemistry may also be employed.

The following examples are intended to illustrate the preparation of the compounds of the invention, but are not to be construed as limiting the scope thereof. Various obvious modifications in the compounds and in the processes for preparing them will occur to those skilled in the art of organic chemistry, and such modifications are to be considered part of the invention.

EXAMPLE 1.—2α,17α-DIMETHYL-B-NORTESTOSTERONE

A mixture of 12.0 g. (0.042 mole) of 17α-methyl-B-nortestosterone, 6.8 g. of sodium hydride (53% suspension in mineral oil), and 12 ml. of ethyl oxalate in 300 ml. of anhydrous thiophene-free benzene is stirred for four hours. The mixture is filtered, the filter cake being thoroughly washed with benzene and hexane. The filter cake is dried under vacuum and then added in portions to an ice-cold solution of 40 ml. of 35% hydrochloric acid in 500 ml. of water. The mixture is extracted with methylene chloride and the combined organic extracts are washed, dried and evaporated in vacuo to give the enol of 2-ethoxalyl-17α-methyl-B-nortestosterone, M.P. 151–2°.

The above 2-ethoxalyl compound is dissolved in 400 ml. of acetone and the soluiton is treated with 37.5 ml. of methyl iodide and 12.5 g. of anhydrous potassium carbonate. The mixture is gently refluxed for about 12 hours, after which another 20 ml. of methyl iodide is added and the refluxing continued for another 36 hours. The reaction mixture is filtered and the filtrate concentrated in vacuo almost to dryness. Dilution with water yields an oil, which is extracted with methylene chloride. The organic extracts are washed with 1% sodium hydroxide and with water, dried, and evaporated in vacuo to give 2-methyl-2-ethoxalyl-17α-methyl-B-nortestosterone as an oil.

This oil is treated with a solution of 1 g. of metallic sodium in 100 ml. of absolute alcohol and allowed to stand at room temperaturre for over 48 hours. This solution is then diluted with 10 volumes of water and the resulting precipitate extracted with methylene chloride. The organic extracts are washed, dried, and evaporated. The residue is chromatographed on 200 g. of alumina (activity III), elution being carried out with 500 ml. portions of benzene. The material obtained from evaporation of the first 3 fractions is rechomatographed, elution being carried out with benzenepetroleum ether (1:1). Fractions No. 4 to 7 from the rechromatography are combined and recrystallized from aqueous methanol to give 2α,17α-dimethyl-B-nortestosterone.

EXAMPLE 2

When 11.5 g. of B-nortestosterone and 12.7 g. of 17α-ethyl-B-nortestosterone are separately used in the procedure of Example 1 in place of 17α-methyl-B-nortestosterone, and the oxalate condensation, alkylation, and reverse oxalate condensation carried out, 2α-methyl-B-nortestosterone and 2α-methyl-17α-ethyl-B-nortestosterone, respectively, are obtained.

EXAMPLE 3

When 10.9 g. of B-nor-19-nortestosterone, 11.5 g. of 17α-methyl-B-nor-19-nortestosterone, and 12.0 g. of 17α-ethyl-B-nor-19-nortestosterone, are separately used in the procedure of Example 1 in place of 17α-methyl-B-nortestosterone, and 60 ml. of ethyl iodide are used in place of methyl iodide, 2α-ethyl-B-nor-19-nortestosterone, 2α-ethyl-17α-methyl-B-nor-19-nortestosterone, and 2α,17α-diethyl-B-nor-19-nortestosterone, respectively, are obtained.

EXAMPLE 4

When 12.8 g. of 19-hydroxy-17α-methyl-B-nortestosterone is used in the procedure of Example 1 in place of 17α-methyl-B-nortestosterone, and 50 ml. of allyl bromide is used in place of methyl iodide, 2α-allyl-19-hydroxy-17α-methyl-B-nortestosterone is obtained.

EXAMPLE 5

To a solution of 1 g. of 2α,17α-dimethyl-B-nortestosterone in 100 ml. of anhydrous pyridine is added either 6 ml. of acetic anhydride or propionic anhydride. The reaction mixture is allowed to stand overnight at room temperature and is then diluted with ice and water. The resulting precipitate is filtered off and recrystallized to give 2α,17α-dimethyl-B-nortestosterone acetate or propionate.

EXAMPLE 6

A mixture of 4.5 g. of 2α-methyl-B-nortestosterone, 10 ml. of cyclopentanone diethyl ketal, and a catalytic amount of p-toluenesulfonic acid is placed in a flask with a water trap and heated at 150–175° C. (bath temperature) until no more distillation occurs. The residue is cooled and diluted with aqueous methanol containing a few drops of pyridine. The mixture is then cooled to give the 1-cyclopentenyl ether of 2α-methyl-B-nortestosterone.

EXAMPLE 7

A mixture of 1 g. of 2α-methyl-B-nortestosterone, an excess of dihydropyran, and a catalytic amount of p-toluenesulfonic acid in benzene is refluxed for a short period of time. Evaporation in vacuo gives the 2-tetrahydropyranyl ether of 2α-methyl-B-nortestosterone.

The following preparations describe the synthesis of otherwise undescribed starting materials necessary for the preparation of the compounds of the invention.

Preparation 1.—B-nor-19-nortestosterone

To a solution of 43.6 g. of 3β,19-diacetoxyandrost-5-en-17-one [J. Kalvoda, et al., Helv. Chim. Acta, 46, 1361 (1963)] in 300 ml. of chloroform is added 25.8 g. of m-chloroperbenzoic acid in 150 ml. of chloroform. The addition is carried out with stirring so that the temperature of the reaction mixture is maintained at 25–30° C. After addition is complete the reaction mixture is allowed to stand for three hours and is then washed with aqueous sodium sulfite and then with aqueous sodium carbonate solution. Drying and evaporation of the chloroform phase gives a residue which is crystallized from acetone-hexane to give 3β,19-diacetoxy-5,6-epoxyandrostan-17-one, M.P. 128–129° C.

To a stirred solution of 3β,19-diacetoxy-5,6-epoxyandrostan-17-one (42 g.) in 1200 ml. of methyl ethyl ketone is added aqueous chromic acid (50 g. of chromium trioxide in 100 ml. of water) at such a rate that the temperature of the reaction mixture does not exceed 40° C. After addition is complete the reaction mixture is maintained at 40° C. for one hour and is then poured into 2500 ml. of water. Extraction with methylene chloride, followed by drying and evaporation of the organic extracts gives crude 3β,19-diacetoxy-5α-hydroxyandrostane-6,17-dione, which may be used in the next step without purification.

To a solution of 42 g. of the crude dione in 200 ml. of chloroform is added 50 g. of m-chloroperbenzoic acid in 350 ml. of chloroform. The addition is carried out slowly with stirring so that the reaction temperature does not rise above 30° C. After stirring at room temperature for 24 hours the reaction mixture is washed with 10% aqueous sodium sulfite solution (500 ml.) and then with 5% aqueous sodium bicarbonate solution (700 ml.). The sodium bicarbonate phase is acidified with phosphoric acid and extracted with chloroform to give, after drying and evaporation of the chloroform, a mixture of m-chlorobenzoic acid and 3β,19-diacetoxy-5,17-dioxo-5,6-secondrostan-6-oic acid.

The above mixture is dissolved in 150 ml. of pyridine and treated with 50 ml. of benzoyl chloride with cooling. After standing for 24 hours at room temperature, the reaction mixture is poured into 1500 ml. of water and extracted with methylene chloride. After washing with cold aqueous phosphoric acid and sodium carbonate solutions, the methylene chloride extracts are combined, dried and evaporated. The residue is heated at 190° C. under a nitrogen atmosphere for ten minutes to give crude 3β,19-diacetoxy-B-norandrost-5-en-17-one, which is then dissolved in ethanol containing excess aqueous potassium hydroxide solution and heated at reflux for two hours. The cooled reaction mixture is poured into water and extracted with methylene chloride to give, after drying and evaporation of the methylene chloride phase, a residue. This material is dissolved in benzene/methylene chloride (9:1) and chromatographed on 125 g. of alumina (III, Woelm). Elution with methylene chloride and methylene chloride-methanol mixtures gives 3β,19-dihydroxy-B-norandrost-5-en-17-one which, after recrystallization from acetone-hexane, melts at 148–150° C.

The diol is dissolved in 35 ml. of acetone and added to a solution of 12 ml. of standard chromic acid reagent (26.7 g. of chromium trioxide and 23 ml. of concentrated sulfuric acid diluted to 100 ml. with water) in 40 ml. of acetone at 0° C. After stirring for six minutes, the reaction mixture is poured into water and extracted with methylene chloride. The methylene chloride extracts are combined and extracted with aqueous sodium bicarbonate solution, then acidified and extracted with methylene chloride to yield 3,17-dioxo-B-norandrost-5-en-19-oic acid after drying and evaporation of the solvent.

The crude acid is dissolved in pyridine and heated at reflux for one hour. The pyridine is evaporated at reduced pressure to leave a residue of 19-nor-B-norandrost-5(10)-ene-3,17-dione.

The Δ⁵⁽¹⁰⁾-dione is dissolved in 50 ml. of methanol containing 0.1 g. of sodium methoxide and then heated at reflux for one hour. The cooled reaction mixture is poured into water and extracted with methylene chloride. Drying and evaporation of the methylene chloride extracts gives a residue which is purified by column chromatography on alumina, followed by crystallization from acetone-hexane, to give 19-nor-B-norandrost-4-ene-3,17-dione.

To a stirred suspension of 1.05 g. of lithium aluminum hydride in 75 ml. of ether is added a solution of 1.6 g. of the Δ⁴-dione in 35 ml. of tetrahydrofuran. The addition is carried out at room temperature with stirring over a 15 minute period. The reaction mixture is then heated to reflux for two hours, cooled, treated with 5 ml. of water and filtered. Evaporation of the filtrate gives a residue of 3β,17β-dihydroxy-19-nor-B-norandrost-4-ene.

The crude diol is dissolved in 50 ml. of dioxane to which is added a solution of 2.5 g. of 2,3-dichloro-5,6-dicyanobenzoquinone in 50 ml. of dioxane. After eight hours at room temperature, the precipitated hydroquinone is removed by filtration and the filtrate is evaporated to a residue which is dissolved in methylene chloride and passed through a column of 30 g. of alumina (III, Woelm). Evaporation of the eluate gives a residue which, after recrystallization from acetone-hexane, melts at 135–136° C. and is 19-nor-B-nortestosterone.

*Preparation 2.—17α-methyl-B-nor-19-nortestosterone*

A solution of 3.0 g. of 3β,19-dihydroxy-B-norandrost-5-en-17-one (Preparation 1) in 100 ml. of tetrahydrofuran is treated with 7.0 g. of methyl lithium. The reaction mixture is heated at reflux under a nitrogen atmosphere for two hours and is then cooled and treated with methanol to destroy excess methyl lithium. The resulting mixture is then poured into water and extracted with methylene chloride to give, after drying and evaporation of the solvent, 3β,17β,19-trihydroxy-17α-methyl-B-norandrost-5-ene, M.P. 200–202° C.

The crude triol is dissolved in 35 ml. of acetone and added to a solution of 12 ml. of standard chromic acid reagent (26.7 g. of chromium trioxide and 23 ml. of concentrated sulfuric acid diluted to 100 ml. with water) in 40 ml. of acetone at 0° C. After stirring for 6 minutes, the reaction mixture is poured into water and extracted with methylene chloride. The methylene chloride extracts are combined and extracted with aqueous sodium bicarbonate solution, then acidified and extracted with methylene chloride to yield 17β-hydroxy-17α-methyl-3-oxo-B-norandrost-5-en-19-oic acid after drying and evaporation of the solvent.

The crude acid is dissolved in pyridine and heated at reflux for 1 hour. The pyridine is evaporated at reduced pressure to leave a residue of 17β-hydroxy-17α-methyl-19-nor-B-norandrost-5(10)-ene-3-one.

The ketone is dissolved in 50 ml. of methanol containing 0.1 g. of sodium methoxide then heated at reflux for 1 hour. The cooled reaction mixture is poured into water and extracted with methylene chloride. Drying and evaporation of the methylene chloride extracts gives a residue which is purified by column chromatography on alumina, followed by crystallization from acetone-hexane, to give 17α-methyl-B-nor-19-nortestosterone, M.P. 154–156°.

Substitution of ethyl lithium for methyl lithium in the reaction described above gives 17α-ethyl-19-nor-B-nortestosterone.

*Preparation 3.—19-hydroxy-17α-methyl-B-nortestosterone*

A mixture of 10.2 g. of 3β,17β,19-trihydroxy-17α-methyl-B-norandrost-5-ene (Preparation 2), 52 ml. cyclohexanone, and 310 ml. toluene is azeotroped until 250 ml. distillate has been collected. Then 3.7 g. of finely ground aluminum isopropoxide is added and heating is continued for 40–45 minutes with a slow distillation. The reaction is quneched with 4 ml. of water and the solids are filtered and leached with 3:1 ethyl acetate-methanol. The filtrates are concentrated to 100 ml. and cooled, and the product filtered giving 19-hydroxy-17α-methyl-B-nortestosterone, M.P. 190–196° C. Recrystallization from 1:1 acetone-methanol yields a melting point of 198–200° C.

[α] = −27.8° (C=0.497 in MEOH); $\lambda_{max.}^{ETOH}$ = 242 mμ (ε = 13,300)

I claim:
1. A chemical compound of the formula:

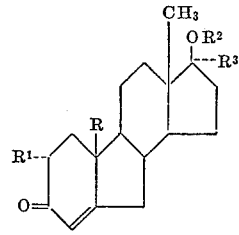

wherein:

R is hydrogen, hydroxymethyl, or methyl;
R¹ is lower alkyl of up to four carbon atoms, allyl, or methylallyl;
R² is hydrogen or lower alkanoyl of up to six carbon atoms;
R³ is hydrogen, methyl, or ethyl; and when R³ is hydrogen, R² can be 1-cyclopentenyl, 1-cyclohexenyl, or 2-tetrahydropyranyl.

2. A chemical compound of the formula:

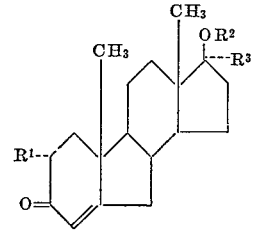

wherein:

R¹ is lower alkyl of up to four carbon atoms, allyl, or methylallyl;
R² is hydrogen, or lower alkanoyl of up to six carbon atoms;
R³ is hydrogen, methyl, or ethyl; and when R³ is hydrogen, R² can be 1-cyclopentenyl, 1-cyclohexenyl, or 2-tetrahydropyranyl.

3. A chemical compound of the formula:

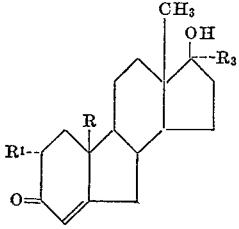

wherein:

R is hydrogen or methyl;
R¹ is lower alkyl of up to four carbon atoms; and
R³ is hydrogen, methyl, or ethyl.
4. 2α,17α-dimethyl-B-nortestosterone.
5. 2α,17α-dimethyl-B-nor-19-nortestosterone.
6. 2α-methyl-B-nortestosterone 1-cyclopentenyl ether.

(References on following page)

References Cited

FOREIGN PATENTS 854,407 11/1960 Great Britain.
879,100 4/1961 Great Britain.

OTHER REFERENCES

Ercoli et al.: "Chem. Abst.," vol. 56, col. 8800i (1962).

LEON ZITVER, *Primary Examiner.*

M. JACOB, *Assistant Examiner.*